United States Patent [19]

Baltrush

[11] 4,021,689
[45] May 3, 1977

[54] STEPPING MOTOR

[75] Inventor: John J. Baltrush, Waterbury, Conn.

[73] Assignee: Robertshaw Controls Company, Richmond, Va.

[22] Filed: Sept. 29, 1975

[21] Appl. No.: 617,751

[52] U.S. Cl. .................................. 310/41; 310/162; 310/49 R

[51] Int. Cl.² .......................................... H02K 7/10

[58] Field of Search ............... 310/41, 49, 162–165, 310/156, 266, 257

[56] References Cited

UNITED STATES PATENTS

| | | |
|---|---|---|
| 2,445,813 | 7/1948 | Walworth, Jr. ................... 310/164 |
| 2,701,845 | 2/1955 | Gallagher et al. ............. 310/164 X |
| 3,119,941 | 1/1964 | Guiot ............................. 310/156 X |
| 3,330,975 | 7/1967 | Osterwalder .................. 310/41 X |
| 3,535,571 | 10/1970 | Heinzen ......................... 310/257 X |
| 3,541,363 | 11/1970 | Vetterman et al. ........... 310/257 X |
| 3,857,053 | 12/1974 | Yatsushiro et al. ............. 310/41 X |

Primary Examiner—Donovan F. Duggan
Attorney, Agent, or Firm—O'Brien & Marks

[57] ABSTRACT

A stepping motor has a rotor with a cylindrical permanent magnet and a stator with a pair of field poles surrounding the rotor magnet, each of the field poles including a major and a minor pole and tilted in a common direction such that the rotor always rotates in a single predetermined direction of rotation.

3 Claims, 6 Drawing Figures

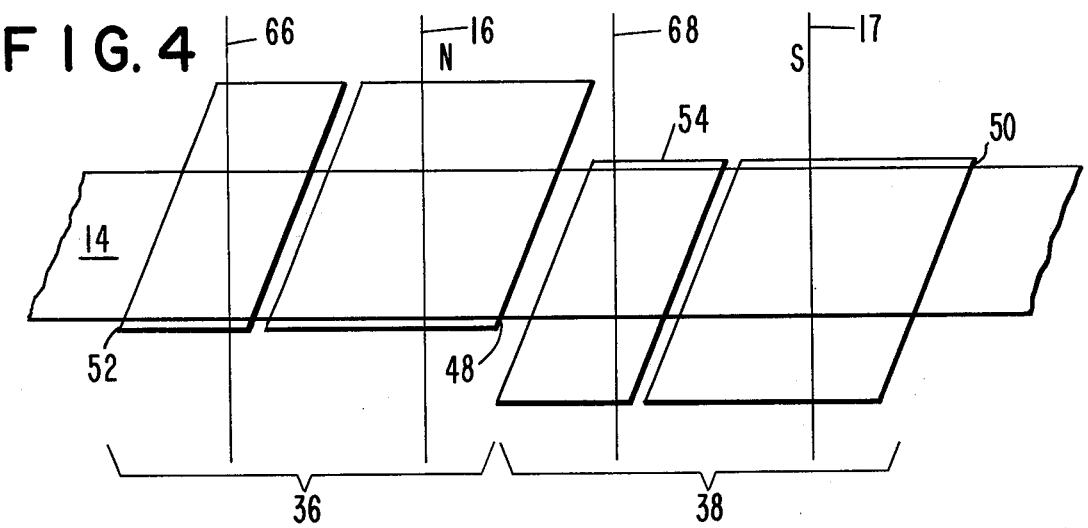
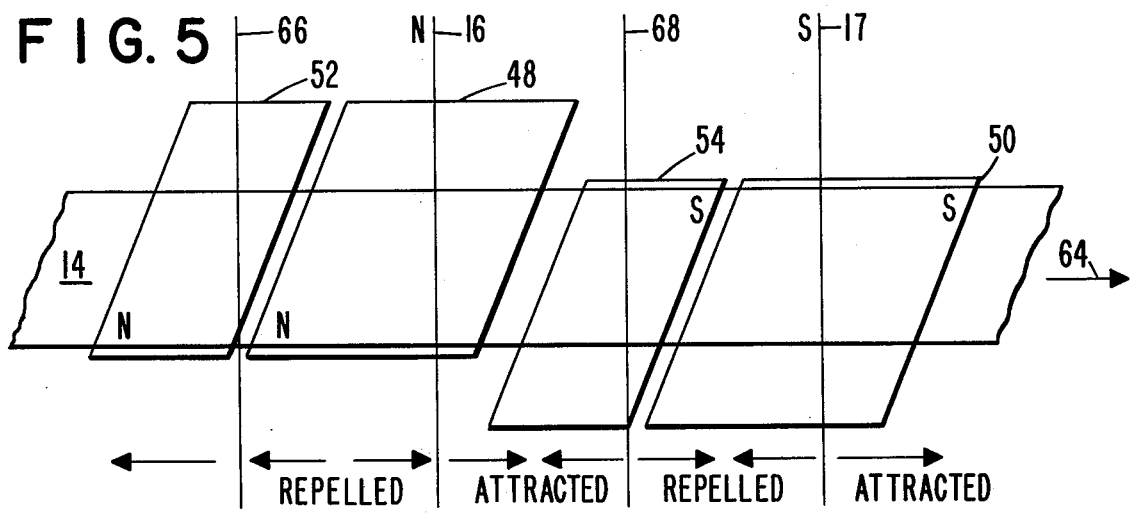
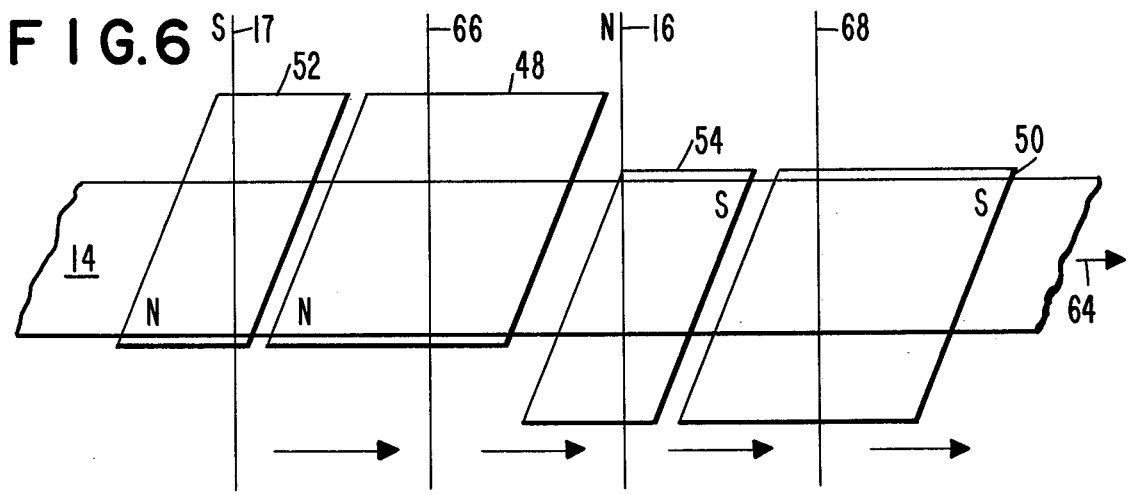

STEPPING MOTOR

BACKGROUND OF THE INVENTION

1. Field of the Invention

The present invention relates to stepping motors and in particular to light duty stepping motors usable as drivers for a clock mechanism.

2. Description of the Prior Art

The prior art as exemplified in U.S. Pat. No. 3,132,558, No. 3,541,363 and No. 3,626,263, contains a number of stepping motors with permanent magnet rotors, and features to ensure rotor rotation in a constant direction.

SUMMARY OF THE INVENTION

The invention is summarized in that a stepping motor includes a rotatably movable permanent magnet rotor, two field poles, each of the field poles having a major and a minor pole, with a flux gap defined therebetween, and a coil energizable to magnetize the field poles, each of the field poles being titled to ensure rotation of the rotor in a single direction.

An object of the invention is to construct a stepping motor in which the rotor always rotates in the same direction.

Another object of the invention is to provide a stepping motor which is reliable, flexible in its application and relatively inexpensive.

An advantage of the invention is that it is extremely simple and easy to construct and repair.

Other objects, advantage and features of the invention will become apparent from the following description taken in conjunction with the accompanying drawings.

BRIEF DESCRIPTION OF THE DRAWINGS

FIG. 4 is a diagram of the position of the motor rotor of FIG. 1 in relation to the field poles of the motor.

FIG. 5 is a diagram of the position of the motor rotor of FIG. 4 after the field poles are magnetized.

FIG. 6 is a diagram of the position of the rotor of FIG. 5 after it has rotated 90°.

DESCRIPTION OF THE PREFERRED EMBODIMENT

Figure 1:
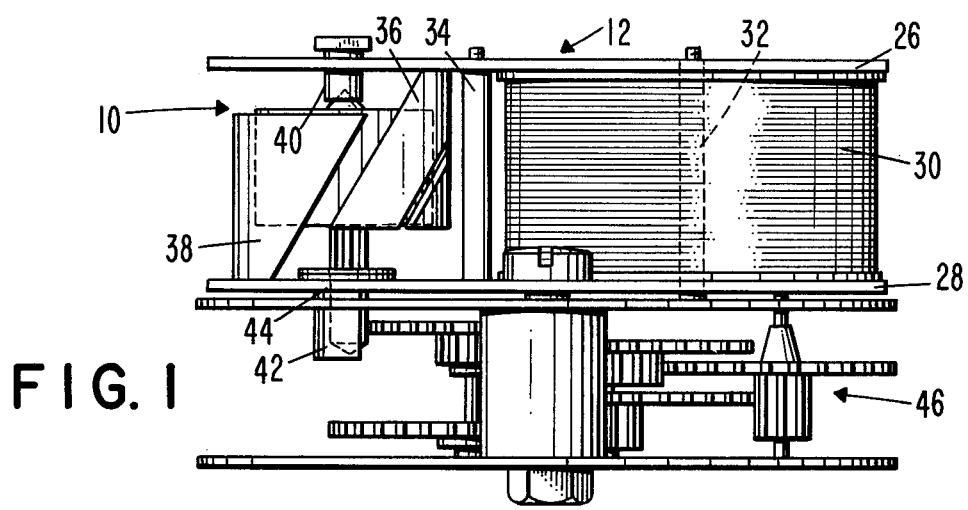
FIG. 1 is a side elevation view of a stepping motor in accordance with the present invention.
Figure 2:
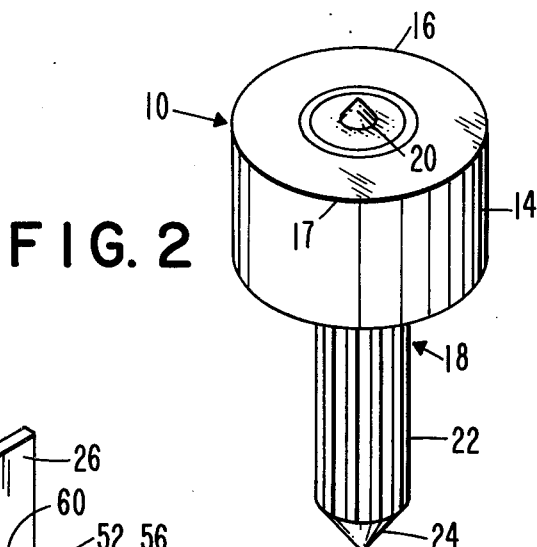
FIG. 2 is an enlarged side view of the rotor of the stepping motor of FIG. 1.

As is best shown in FIG. 1, the present invention is embodied in a stepping motor including a rotor 10 and a stator 12. The rotor 10 includes, as is best shown in FIG. 2, a cylindrical permanent magnet 14 having a north pole, indicated at 16, and a south pole, indicated at 17, the poles being located at opposite extremes of the periphery of the cylindrical magnet 14. The magnet 14 is fixedly mounted on a shaft 18 which extends through the central axis of the cylinder of the magnet 14. The shaft has at its upper end a first conical point 20 and at its lower end a ribbed portion 22 terminating in a second conical point 24.

The stator 12 includes a pair of fixed parallel mounting plates 26 and 28 made of suitable magnetically conductive material. Secured between the mounting plates 26 and 28 is an electromagnetic field coil 30 which is coiled around a magnetically conductive core 32 connecting the mounting plates 26 and 28. One or more support rods 34 connect the two mounting plates 26 and 28 to keep them in fixed parallel alignment. Fixed to the field pole 26 and integral therewith is a field pole 36 and integrally fixed to the mounting plate 28 is a field pole 38. The rotor 10 is mounted in the stator 12 so that the magnet 14 lies between the field poles 36 and 38. The first conical point 20 is received in an adjustable first concave bearing 40 mounted on the mounting plate 26. The second conical point 24 is received in a second bearing 42 mounted beneath the mounting plate 28. The ribbed portion 22 of the shaft 18 extends through a recess 44 in the mounting plate 28 receives in its ribs the teeth of a first of a set of gears 46. The gears 46 serve to reduce the rotary movement of the rotor 10 to a suitable speed for moving the movement of a clock.

Figure 3:
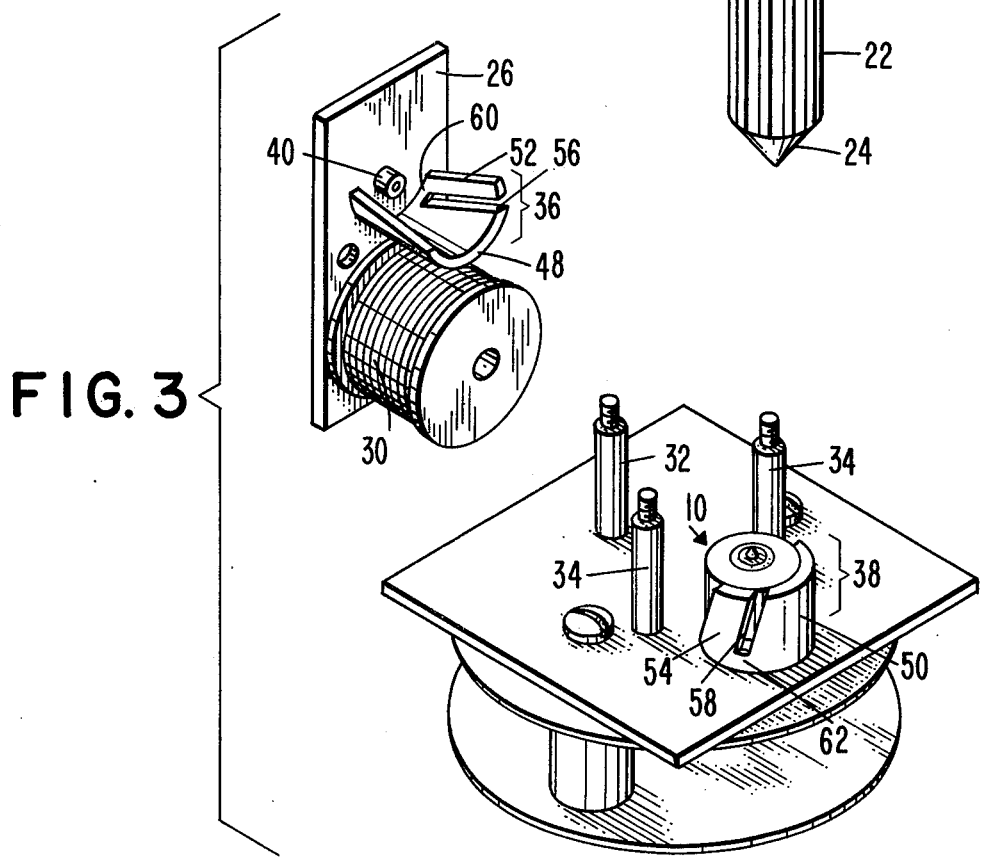
FIG. 3 is an exploded view of the stepping motor of FIG. 1 in a dissassembled state.

Details of the field poles can be best seen in FIG. 3 in which the field poles 36 and 38 are shown on their separated respective mounting plates 26 and 28. Each of the field poles 36 and 38 includes a larger major pole 48 and 50 and a smaller minor pole 52 and 54. The major poles 48 and 50 are separated from their respective minor poles 52 and 54 by flux gaps 56 and 58 formed as slots in the field poles 36 and 38. The major poles 48 and 50 are joined to the respective minor poles 52 and 54 at their bases bridge portions 60 and 62. The field poles 36 and 38 are curved so that their inner surfaces have the shape of an arcuate section of a circle having a slightly greater diameter than the diameter of the magnet 14 of the rotor 10. The edges of the major poles 48 and 50, the minor poles 52 and 54 and the flux gaps 56 and 58 are all titled or canted in a common direction. In order for all the poles to be tilted in a common direction the field pole 36 tilts toward the minor pole 52 and the field pole 38 tilts toward the major pole 50. This tilt combined with the curvature of the field poles 36 and 38 causes both the major poles 48 and 50 and the minor poles 52 and 54 to have the shape of a section of a tubular spiral cut from a hollow cylinder surrounding the rotor 10.

In the operation of the stepping motor of FIGS. 1-3, the rotor 10, with its conical points 20 and 24 held in the bearings 40 and 42, is free to rotate about is axis. The rotor 10 will rest, when the coil 30 is not energized, in a steady condition at the point where the magnetic reluctance to the flux from the permanent magnet 14 is at a minimum. This minimum is reached when the north pole 16 and the south pole 17 of the magnet 14 are each aligned at the center of a respective one of the major poles 48 and 50 of the field poles 36 and 38. The reluctance is less at a major pole, even though the major and minor poles are of equal distance from the rotor 10, because of the greater size of the major poles 48 and 50. This position of the rotor 10 is diagrammatically illustrated by FIG. 4.

FIG. 4 is a planar projection of the rotational position of the rotor 10 and the rotor magnet 14 with respect to the field poles 36 and 38 as viewed from the central axis of the cylinder of the magnet 14. In this illustration the north pole 16 of the rotor magnet 14 has aligned itself with the major pole 48 and the south pole 17 of the magnet 14 has aligned itself with the major pole 50. Indicated by the lines 66 and 68 are the areas of minimum flux on the magnet 14, the strength of the magnetic field generated by the magnet 14 decreasing steadily from each of the poles 16 and 17 to the minimum lines 66 and 68. The minimum lines 66 and 68 lie, at this position, adjacent the minor poles 52 and 54. The bridge portions 60 and 62 and the mounting plates 26 and 28 are not represented in this diagram because, even though they are magnetic materials, they are too far removed from the rotor magnet 14 to affect its position.

When the rotor 10 is to be rotated a DC exciting voltage is applied to the field coil 30. This magnetizes the magnetic core 32 and makes the mounting plates 26 and 28 and therefore the field poles 36 and 38 opposite poles of a magnetic field generated by the coil 30. To rotate the rotor from a position of FIG. 4 a north pole of the electromagnetic field is applied to the field pole 36 and a south pole is applied to the field pole 38. Thus the major pole 48 and the minor pole 52 are electromagnetic north poles and the major pole 50 and the minor pole 54 are south poles. This causes the rotor 10 to start to rotate in the direction indicated by the arrow 64 in FIG. 5. The greatest forces moving the rotor 10 are the repulsion of the rotor north pole 16 from the electromagnetic pole now on the major pole 48, the attraction of the north pole 16 toward the south pole on the major pole 50, the repulsion of the rotor south pole 17 from the major pole 50, and its attraction toward the major pole 48. But these forces will not alone determine a constant direction of rotor rotation inasmuch as a movement in either direction could be caused by these symmetrical forces. The direction of the rotor movement is determined by the minor poles 52 and 54. The rotor north pole 16 is repelled by the minor pole 52 and attracted by the minor pole 54 and the rotor south pole 17 is repelled by the minor pole 54 and attracted by the minor pole 52. Thus the forces acting on the rotor are asymmetrical and the rotor 10 will rotate in a fixed direction as indicated by the arrow 64.

The effect of the minor poles 52 and 54 is further enhanced by the tilt of the field poles 36 and 38. This tilt serves to bring, for instance, the minor pole 52 closer to the rotor north pole 16 at the top edge of the magnet 14 in order to maximize the repulsive force. Similarly the top edge of the magnet 14, the minor pole 54 is brought slightly closer to the south pole 17 by the tilt, and the minor poles 54 and 52 are brought slightly nearer the north pole 16 and the south pole 17 respectively at the bottom edge of the magnet to maximize the attractive forces.

The rotor 10 will then continue to rotate as is shown in FIG. 6, in which the rotor has rotated 90°. The rotor will continue to rotate until it has reached a position of almost 180° from the starting position of FIG. 4. The rotor will not quite reach a full 180° reversal while the field coil 30 is energized due to the pressure of the flux from the minor poles. Thus the rotor will come to rest at a position slightly less than 180° rotated from the position of FIG. 4. When the voltage is removed from the field coil 30, the magnetic field from the field poles 36 and 38 ceases and the magnet 14 moves the rotor 10 to the position of least reluctance which is the position exactly 180° rotated from FIG. 4. To continue the rotation of the rotor the voltage across the field coil 30 is reversed causing the rotor 10 to continue to rotate another 180° in the same direction ending at the position of FIG. 4 again. This movement is transmitted by the gears 46 to the clock mechanism.

It is not necessary for a stepping motor constructed according to this invention to have simply one sets of field poles. As many sets of field poles can be constructed as a necessary to provide as many motor steps and desired as long as each field pole has a major and a minor pole alltilted in the proper direction.

Inasmuch as many modification, variations and changes in detail can be made to the presently described or shown on the accompanying drawings be interpreted in an illustrative and not in a limiting sense.

What is claimed is:

1. A stepping motor comprising
a rotatably movable rotor having mounted thereon a cylindrical permanent magnet,
two field poles, each of the field poles having a major and a minor pole with a flux gap therebetween and each of the field poles having an arcuate shape and being positioned so as to surround the cylindrical magnet of the rotor,
a coil energizable to magnetize the field poles,
each of the field poles being tilted and formed in the shape of a spiral section of a cylinder surrounding the cylindrical magnet so as to ensure rotation of the rotor in a single direction.

2. A stepping motor comprising
first and second parallel mounting plates composed of magnetically conductive material,
a field coil disposed between the mounting plates and adapted to being engaged from a remote source of voltage,
a core comprised of magnetically conductive material and projecting through the field core and connecting the first and second plates so as to conduct magnetic force thereto,
a bearing on each of the first and second plates,
a field pole of magnetically conductive material projecting from each of the first and second plates toward the opposite plate and magnetizable by the field coil through the first and second plates,
each field pole having an arcuate curvature such that a cylindrical space is defined between the poles,
each of the field poles having a major and a minor pole with a flux gap defined therebetween, and
a rotor including a cylindrical permanent magnet with a mounting shaft therethrough and a conical point at each end of the shaft, each of the conical points being received in a respective one of said bearings such that the rotor is positioned between the first and second plates in a freely rotatable manner and the magnet on the rotor is positioned in the space between the field poles,
each of the field poles being tilted in a common direction to ensure rotation of the rotor in a single direction.

3. A stepping motor as claimed in claim 1 wherein the coil is mounted between a pair of magnetically conductive plates with a magnetizable core extending through the coil to connect the plates, the field poles each being mounted on a respective one of the plates so that they can be magnetized by the field coil through the plates.

* * * * *